US008516123B2

(12) United States Patent
Xie et al.

(10) Patent No.: US 8,516,123 B2
(45) Date of Patent: Aug. 20, 2013

(54) RUNTIME VALIDATION OF MESSAGES FOR ENHANCED WEB SERVICE PROCESSING

(75) Inventors: Nan Xie, San Mateo, CA (US); Vebhhav Singh, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2134 days.

(21) Appl. No.: 10/778,515

(22) Filed: Feb. 12, 2004

(65) Prior Publication Data

US 2005/0198154 A1 Sep. 8, 2005

(51) Int. Cl.
*G06F 15/16* (2006.01)

(52) U.S. Cl.
USPC ........................................................ 709/227

(58) Field of Classification Search
USPC ........................................................ 709/227
See application file for complete search history.

(56) References Cited

U.S. PATENT DOCUMENTS

| 6,961,760 | B2 | 11/2005 | Li et al. | |
|---|---|---|---|---|
| 2002/0156685 | A1 | 10/2002 | Ehrlich et al. | |
| 2003/0069975 | A1 | 4/2003 | Abjanic et al. | |
| 2004/0044729 | A1 | 3/2004 | Foerg et al. | |
| 2005/0091386 | A1* | 4/2005 | Kuno et al. | 709/228 |
| 2006/0036941 | A1* | 2/2006 | Neil | 715/526 |
| 2006/0265689 | A1* | 11/2006 | Kuznetsov et al. | 717/117 |

OTHER PUBLICATIONS

Kuassi Mensah, et al., Oracle Corporation, "Database Web Services," An Oracle White Paper, Nov. 2002, pp. 1-21.
Oracle Corporation, "J2EE and Internet Application Development and Deployment," Oracle9i Application Server Concepts, Release 2 (9.0.2), Part No. A95926-02, 2002, http://download-west.oracle.com/docs/cd/A97329_01/core.902/a95926/webstapp.htm, data retrieved May 11, 2004, pp. 1-32.
Oracle Corporation, "J2EE Overview," Oracle9iAS Containers for J2EE User's Guide, Release 2 (9.0.2), Part No. A95880-01, 2002, http://download-west.oracle.com/docs/cd/A97329_01/web.902/a95880/overview.htm, data retrieved May 11, 2004, pp. 1-17.
Oracle Corporation, "Configuration and Deployment," Oracle9iAS Containers for J2EE User's Guide, Release 2 (9.0.2), Part No. A95880-01, 2002, http://download-west.oracle.com/docs/cd/A97329_01/web.902/a95880/config.htm, data retrieved May 11, 2004, pp. 1-23.
Oracle Corporation, "Advanced Configuration, Development, and Deployment," Oracle9iAS Containers for J2EE User's Guide, Release 02 (9.0.2), Part No. A95880-01, http://download-west.com/docs/cd/A97329_01/web.902/a95880/advanced.htm, data retrieved May 11, 2004, pp. 1-26.
Oracle Corporation, "Security," Oracle9iAS Containers for J2EE User's Guide, Release 2 (9.0.2), Part No. A95880-01, http://download-west.oracle.com/docs/cd/A97329_01/web.902/a95880/security.htm, data retrieved May 11, 2004, pp. 1-20.

(Continued)

*Primary Examiner* — Ryan Jakovac
(74) *Attorney, Agent, or Firm* — Hickman Palermo Truong Becker Bingham Wong LLP

(57) ABSTRACT

Inbound processing of web service request messages at runtime is enhanced by providing validation of the message structure against corresponding schema, at an intermediary web service server rather than at the web service level (e.g., entirely by a web service application). Hence, there is minimal delay in responding to the client upon determining an invalid message structure, and unnecessary processing of invalid messages by the web service application is avoided.

21 Claims, 3 Drawing Sheets

(56) References Cited

OTHER PUBLICATIONS

Oracle Corporation, "Using Oracle SOAP," Oracle9i Application Server Web Services Developer's Guide, Release 2 (9.0.2), Part No. A95453-01, http://download-west.oracle.com/docs/cd/A97329_01/web.902/a95453/oraclesoap.htm#64, data retrieved May 11, 2004, pp. 1-35.

"Apache SOAP Frequently Asked Questions (FAQ)," http://ws.apache.org/soap/faq, data retrieved May 11, 2004, pp. 1-5.

Kuznetsov, E., "XML-Aware Networking" XML Journal, 'Online! (Jul. 31, 2002), pp. 1-3; XP002330142, Retrieved from the Internet on May 31, 2005, URL: http://xml.sys-con.com/read/40447.htm>.

Notification of Transmittal of the International Search Report and the Written Opinion of the International Searching Authority, or the Declaration (11 pages) received Jun. 15, 2005 in corresponding International application No. PCT/US2005/004560.

Pending Claims in corresponding International application No. PCT/US2005/004560.

* cited by examiner

RUNTIME VALIDATION OF MESSAGES FOR ENHANCED WEB SERVICE PROCESSING

FIELD OF THE INVENTION

The present invention relates generally to communications between clients and web service applications and, more specifically, to techniques for validating the structure of messages, such as SOAP messages, for enhanced web services runtime processing.

BACKGROUND OF THE INVENTION

Generally, a web service can be defined as any information sources or business processes that are conveniently made available for use by a network-connected client application or end-user. Hereinafter, "web service application" refers to computer code that, when executed, performs some work or application logic which is referred to as the "web service." For example, a web service may output a country and state in response to an input postal zip code, where the executing code that performs the work to determine the output is the corresponding web service application. Web service applications typically consist of some combination of programming and data that are hosted by an application server, with processing of communications between a client and a web service application hosted by a web service platform.

A web service platform includes a server, which enables packaging, sending and receiving messages that conform to a suitable message framework, such as SOAP (Simple Object Access Protocol). SOAP is a lightweight protocol intended for exchanging structured information in a decentralized, distributed environment. SOAP defines the use of XML and relevant transport protocols to access services, objects, and servers in a platform-independent manner, thereby promoting interoperability across platforms. SOAP Version 1.2 is described in a W3C Recommendation entitled "SOAP Version 1.2 Part 1: Messaging Framework", which is incorporated by reference in its entirety for all purposes as if fully disclosed herein.

Web Services Description Language (WSDL) is an Extensible Markup Language (XML) format for describing web services as a set of endpoints operating on messages containing either document-oriented or procedure-oriented information. The operations and messages associated with a web service are described abstractly using WSDL, and then bound to a particular network protocol and message format to define an endpoint. A WSDL representation of a web service typically includes information about available operations and expected input and output message structures. A document described as Version 1.1 of Web Services Description Language is available from the World Wide Web Consortium (W3C). WSDL 1.1 is incorporated by reference in its entirety for all purposes as if fully set forth herein.

Descriptions of web services are commonly published in Universal Description, Discovery, and Integration (UDDI) registries, from which they are available for metadata querying, retrieval and interpretation by a potential web service client. A collection of documents described as UDDI Version 3 Specification is available from the OASIS (Organization for the Advancement of Structured Information Standards) UDDI Specifications Technical Committee. The collection of documents is currently described as including (1) UDDI Version 3.0 Features List; (2) UDDI Version 3.0; (3) UDDI Version 3.0 XML Schema; (4) UDDI Version 3.0 WSDL Service Interface Descriptions; all of which are incorporated by reference in their entirety for all purposes as if fully set forth herein. UDDI Version 3.0 provides a specification for building flexible, interoperable XML web services registries that are useful in private as well as public deployments of web services, and offers clients and application developers a comprehensive and complete blueprint of a description and discovery foundation for a diverse set of web services architectures.

By discovering and digesting a WSDL representation of a web service, a client formulates appropriate SOAP messages, and thereby invokes the operations (web services) on the web service server during runtime. The client-constructed SOAP messages should adhere to the XML document structures outlined in the WSDL representation. This XML structure is often denoted or referenced in a WSDL representation using one or more XML schema definitions. The WSDL representation may contain definitions on a request SOAP header, a request SOAP body (e.g., a business XML document), a response SOAP header, and a response SOAP body, for both RPC and document invocation paradigms.

A web service application may be bombarded by many incoming messages from clients, each of which may or may not result in an actual web service invocation. The web service application can only process SOAP request messages having correct structures with respect to their respective schema definitions referenced in associated WSDL representations. However, the various web services platforms that are presently available (e.g., Apache SOAP, J2EE (JAX-RPC, JAXM), and Oracle SOAP), do not implement message validation logic. As a result, web service applications may waste computational resources attempting to process invalid messages and often asynchronously respond with an error message to the requesting client.

To make up for the lack of validation in the platform domain, a web service application situated behind the web services platform may conduct some degree of XML structure validation and respond with errors whenever pertinent anomalies occur, as mentioned. However, application level validation is inherently insufficient because such validation processing examines business documents, which are carried as the body of a SOAP message, for their structural integrity while remaining oblivious to the rest of the XML structures in SOAP messages, such as the SOAP header. Furthermore, application level validation processing is a distinct, disjunct, and asynchronous processing step apart from the step of receiving the SOAP message at the web services server. Consequently, it would not be feasible for the web services server to notify clients of any malformations on SOAP XML structures in a synchronous manner. Still further, by delaying the XML structure validation to a later processing step at the application level, valuable processing resources, such as storage, CPU cycles, runtime, memories, and the like, are squandered.

Based on the foregoing, there is a general need for improved web service message processing. In addition, there is a more specific need for improved runtime validation of web service message structures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described herein for runtime validation of messages for enhanced web services processing. More specifically, techniques are described for runtime validation of the structure of SOAP messages against corresponding schema definitions, by a web services platform component, such as a web service server that is intermediary between a client and a web service application.

SUMMARY OF EMBODIMENTS OF THE INVENTION

Inbound processing of web service request messages at runtime is enhanced by providing validation of the message structure against corresponding schema, at a web service server rather than at the web service level (e.g., by the web service application). Hence, there is minimal delay in responding to the client upon determining an invalid or corrupt message structure, i.e., the response is synchronous; and unnecessary processing of corrupt messages by the web service application and application server is avoided.

In an embodiment, a message is received from a client at an intermediary server, such as a web service server, which handles communications between the client and a web service application. Such message is received at runtime by the web service application and, therefore, is related to execution of the web service logic. The intermediary server validates at least a portion of the message by determining whether the structure of the portion complies with one or more corresponding schema definitions. If the portion of the message complies with the corresponding schema definition, then the message is passed to the web service application for processing. If, on the other hand, the portion of the message does not comply with the corresponding schema definition, then the message is rejected. An error message may be transmitted back to the client to indicate that a portion of the message does not comply with the schema to which it is supposed to comply.

According to various embodiments, the intermediary server validates the message header, the message body, or both the message header and body, against one or more corresponding schema definitions. Furthermore, the intermediary server may validate the header and pass the message on to the pertinent web service application for validation of the body.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Operating Environment

Figure 1:
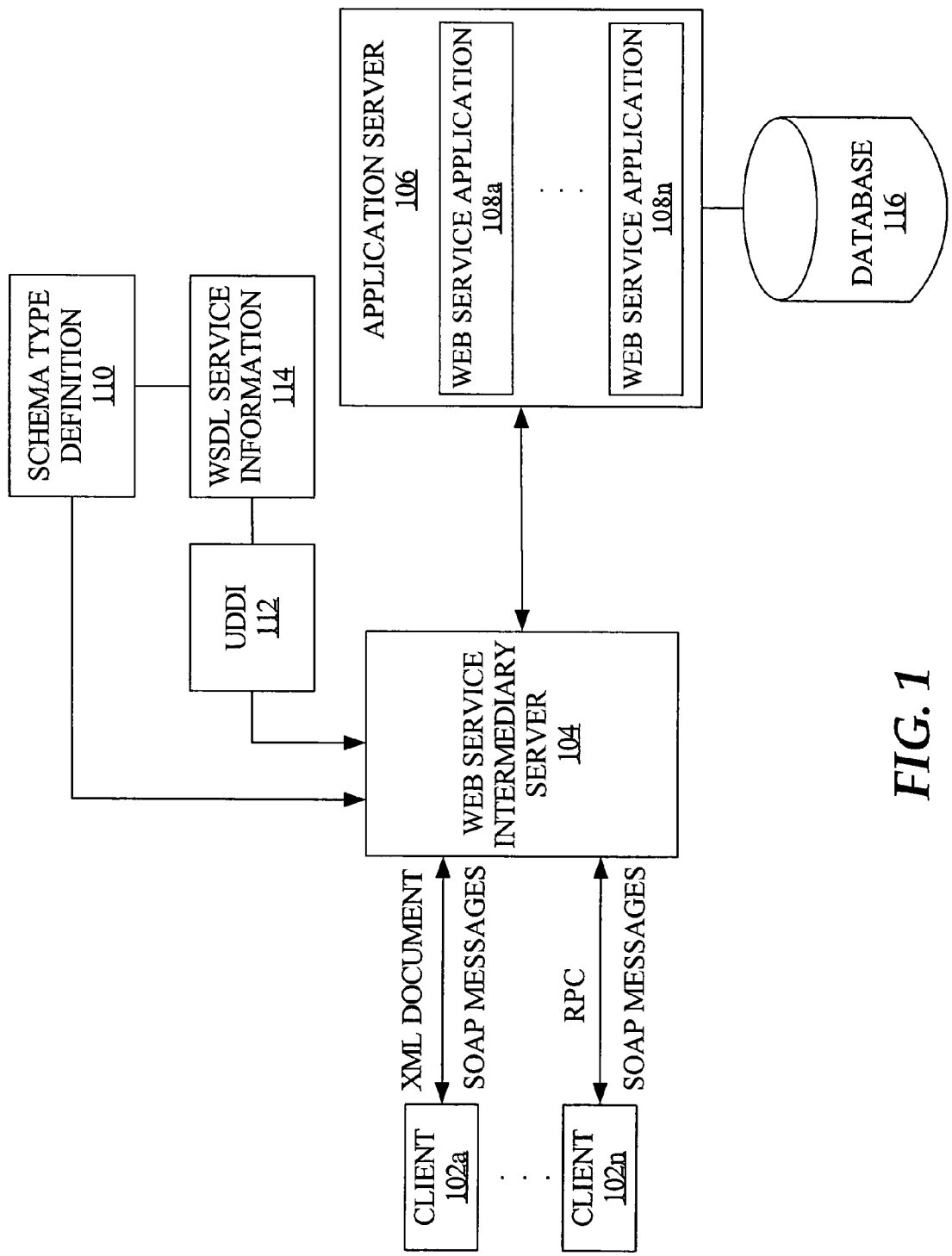
FIG. 1 is a block diagram that illustrates an operating environment in which embodiments of the invention may be implemented.

FIG. 1 is a block diagram that illustrates an operating environment in which embodiments of the invention may be implemented. The illustrated operating environment includes clients 102a-102n, which communicate with a web service intermediary server 104 (sometimes referred to as a "web service server"; hereinafter "intermediary server") via a network. Intermediary server 104 is communicatively coupled to an application server 106 that hosts one or more web service applications 108a-108n. Intermediary server 104 may communicate with application server 106 (A) via a network, if remotely located from each other, using messages of suitable formats; (B) via a bus, if both are configured on the same computer; or (C) via the same or different executing processes or threads, if the intermediary server 104 and the application server 106 are different software modules executing in the same or different memory spaces, respectively, such as by using an API call.

The network(s) through which the various components may communicate may contain any number of network infrastructure elements including routers, switches, gateways, etc. For example, the network may be the public Internet or a private LAN. In one embodiment, the network is a TCP/IP network in which infrastructure elements execute a conventional routing protocol for routing packets among the infrastructure elements. Although embodiments are described herein with reference to the TCP/IP protocols, implementations are not limited to use of TCP/IP. Rather, other network communication protocols, including protocols that are not yet developed, may be used to implement these techniques.

Clients 102a-102n are software applications that each comprises sequences of instructions that are executable by one or more processors. For example, clients 102a-102n are programs that are executable on a computer system such as the system illustrated in FIG. 3. Examples of clients include a conventional web browser and a business application, such as an enterprise Purchasing application. There is no necessary relationship or similarity between clients 102a-102n, unless otherwise described herein.

Each of the clients 102a-102n is capable of outputting requests for information or services, with associated data. Such requests can be transmitted to a web service application 108-108n to perform work or transactions, i.e., to execute a web service. Clients 102a-102n may invoke web service applications 108a-108n using either an RPC (Remote Procedure Call) style or a document style (i.e., with XML document payload), as depicted in FIG. 1 by arbitrarily showing client 102a using document style and client 102n using RPC style. One prevalent standard protocol governing the passing of information between clients 102a-102n, the intermediary server 104 and, possibly, the web service applications 108a-108n, is SOAP.

Intermediary server 104 is software that comprises sequences of instructions that are executable by one or more processors and may include, for example, a set of library files, or precompiled routines, that a program can call to perform a function. Intermediary server 104 is a web service infrastructure layer and may be a component of an integrated web service platform. Therefore, intermediary server 104 may be implemented as an integrated module of application server 106.

Broadly, intermediary server 104 is any mechanism that enables packaging, transmission and reception of information according to a relevant protocol. In the context of web services, and throughout this description, intermediary server 104 is a mechanism for providing server-side infrastructure for running web services, and may also provide for deployment and management of such services. Furthermore, intermediary server 104 may provide a client-side API for invoking SOAP services. Suitable examples of web service intermediary server 104 include Apache SOAP, Oracle SOAP and J2EE (Java 2 Platform, Enterprise Edition) JAXM and JAX_RPC.

Application server 106 is software that comprises sequences of instructions that are executable by one or more processors, for deploying and enabling execution of web service applications 108a-108n. Application server 106 is an environment over which web service applications 108a-108n execute. Application server 106 may be referred to as middle-tier software because it operates between a database client and a database 116, which stores information used to perform the work of web service applications 108a-108n. One suitable example of application server 106 is Oracle Application Server.

Web service applications 108a-108n typically include some combination of programming and data that are made available from application server 106 for end users and other network-connected application programs, such as clients 102a-102n. There is no necessary relationship or similarity between web service applications 108a-108n, unless otherwise described herein. For example, web service application 108a may provide a Purchasing service and web service application 108n may provide a Human Resources service, each called by respective clients.

Web services are capable of being described or specified in a web service description, which is published in or registered with a directory, such as UDDI 112. WSDL service information 114 describes characteristics of a web service. Included in those characteristics are requirements for invoking a given web service application, such as the required input information, format, invocation procedure, encoding scheme, and the like. WSDL service description 114 may include pointers or links to schema type definitions 110, or may include the schema type definitions 110 directly in-line rather than pointers or links thereto.

An XML schema is an abstract representation of an XML object's structure and relationship to other XML objects. Schema type definition 110 is a representation of the structure of incoming SOAP messages to a respective web service application. Thus, each of web service applications 108a-108n is described in a corresponding WSDL service description 114, which references one or more corresponding schema type definitions 110 that specify the structure of incoming SOAP messages to the respective web service application. Each web service application may be bound to, or associated with, a single schema type definition that specifies the structure of the message header and the message body, or with multiple schema type definitions, for each of the message header and message body.

FIG. 1 depicts schema type definition 110 connected to WSDL service information 114 connected to UDDI 112, to illustrate that the WSDL service information 114 is typically available from UDDI 112 and that WSDL service information 114 contains a reference to a corresponding schema type definition 110. However, upon digesting WSDL service information 114, intermediary server 104 may access schema type definition 110 directly from its storage location, independent of UDDI 112. In other words, schema type definition 110 is not necessarily stored in UDDI 112 along with its corresponding WSDL service information 114. Furthermore, WSDL service information 114 may simply be referenced in UDDI 112, and stored elsewhere.

A web service application, such as any of web service applications 108a-108n, is optionally coupled to, or has access to, a database 116. Database 116 is any conventional data repository for storing, managing and retrieving data. A database server may be an integral or highly dependent component of a given application server, or may reside on a separate machine and simply expose APIs for interactions between a web service application and the database server. Database 116 may serve as the data storage and retrieval mechanism for a web service application, or a place where related business logic is implemented or data models defined. The type of data storage may vary from implementation to implementation and, therefore, is not limited to a database.

Method For Processing Web Service Messages

Figure 2:
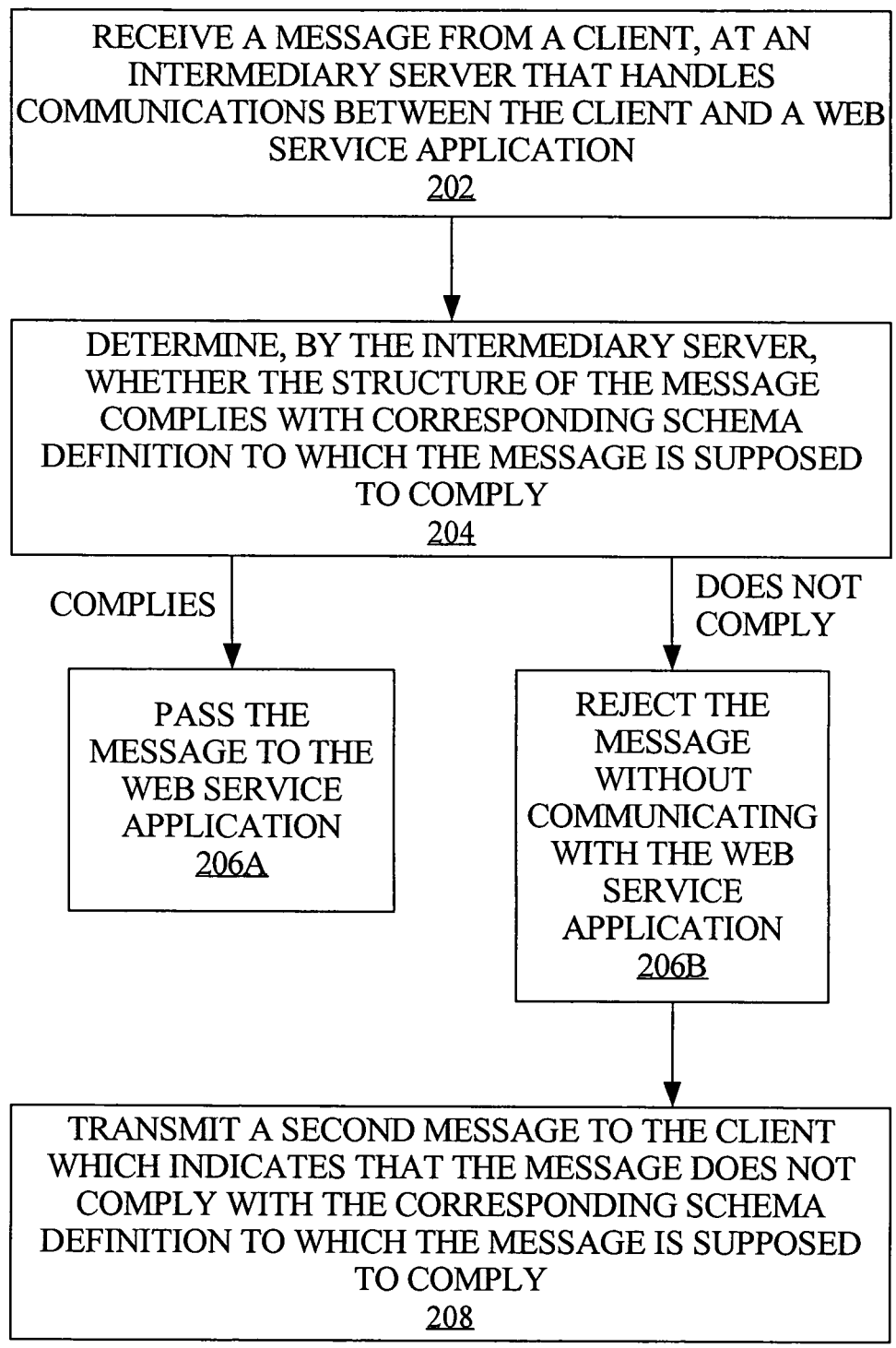
FIG. 2 is a flow diagram that illustrates a computer-implemented process for processing web service messages, according to an embodiment of the invention.

FIG. 2 is a flow diagram that illustrates a computer-implemented process for processing web service messages. The process illustrated in FIG. 2 is performed by an intermediary server, such as intermediary server 104 (FIG. 1), that handles communications between a client and a web service application.

At block 202, an intermediary server receives a message from a client. For example, web service intermediary server 104 receives a SOAP message from client 102a, directed to web service application 108a for invoking business logic that the associated web service implements to perform some work, i.e., to provide an associated web service. As mentioned, intermediary server 104 is a web service infrastructure component, which functions as an intermediary for handling communications between clients 102a-102n and web service applications 108a-108n. Hence, the message from the client is intercepted by the intermediary server 104 before it reaches the target web service application.

At block 204, the intermediary server determines whether the structure of at least a portion of the incoming message complies with a corresponding structure definition to which the message is supposed to comply. In other words, the intermediary server validates the incoming message structure against, for example, a schema definition such as schema type definition 110 that is referenced in a corresponding WSDL service definition, such as WSDL service information 114. Such validation may be performed on the message header only, the message body only, or both the message header and message body.

In order to validate the incoming message, intermediary server 104 requires access to the structure definition that corresponds to the message, based on the web service application 108a-108n to which the client directed the message. Hence, intermediary server 104 identifies and locates the one or more schema type definitions that are needed to validate the incoming message. In a scenario in which runtime SOAP messages are embedded with certain XML element names, which may contain associated XML namespaces, intermediary server 104 can readily identify the corresponding schema type definitions in these namespaces, which are in turn used for the validation process. In one embodiment, with a given schema type name and namespace, an XML parser is used to obtain the actual schema type definition from its native storage. For example, the incoming SOAP message may contain XML element names and URIs identifying the namespaces, which intermediary server 104 can use to identify and retrieve the schema type definition for validation purposes.

In other scenarios, intermediary server 104 does not rely on inspection of the incoming SOAP message to directly identify the relevant schema type definition. WSDL service information 114 may either define the structure of corresponding messages as schema types, e.g., XML structures, within the WSDL service information itself; or may reference a remotely stored schema type definition using include, refine or import operators. From the identification of the relevant schema type definition, intermediary server 104 can resolve the associated WSDL service information 114 from UDDI 112, if necessary.

For example, intermediary server 104 may determine which web service application to invoke based on the incoming SOAP message and, with knowledge of the relevant web service, can refer to an internal mapping of web service-to-WSDL service information (generated, for example, at the time of deployment of the web service) to identify the relevant WSDL service information, such as WSDL service information 114. From there, intermediary server 104 can access the WSDL service information, either from local storage or from a remote UDDI, from which it can identify the relevant one or more schema type definitions to use to validate the structure of incoming messages.

Once the relevant schema type definition is obtained, then validation of SOAP messages against the schema type definition can proceed. The actual network infrastructure that is utilized for storing schema type definitions can vary from implementation to implementation. For example, schema type definitions may be stored remotely in a shared repository, such as database 116, or may be stored locally, such as in memory allocated to and used by application server 106.

As long as the message validation logic is provided by intermediary server 104, the actual placement of the validation processing along the inbound processing flow, with respect to the remainder of the processing provided by intermediary server 104, can vary from implementation to implementation. For example, validation processing can be installed up-front as the first step when handling an inbound SOAP message. This is reasonable in that an unqualified message can be immediately rejected, and the intermediary server 104, as well as the application server 106, are spared unnecessary processing. Since the intermediary server 104 is likely to provide pluggable handler software architecture, the validation logic can readily be implemented as the first pre-handler and deployed into the intermediary server 104 chain of processing.

Furthermore, since validation processing of incoming messages consumes runtime resources and might affect system performance, the validation processing may be implemented to be applicable to select messages only. For example, validation may be invoked for the initial stage of communication between the requesting client and the web service application by way of the intermediary server 104, such as during an initial setup and test stage. Therefore, upon establishing trust and procedures among the various communication parties, the validation logic can then be automatically disabled.

If intermediary server 104 determines that the portion of the message complies with the corresponding schema at block 204, then at block 206A, the message is passed to the web service application for fulfilling the request. If intermediary server 104 determines that the portion of the message does not comply with the corresponding schema at block 204, then at block 206B, the message is rejected, without communicating with the web service application. Hence, unnecessary processing by the web service application is avoided because a non-compliant message never reaches the application.

In one embodiment, a message is transmitted from intermediary server 104 to the requesting client 102a, indicating that the message does not comply with the structure to which it is supposed to comply, block 208. In a related embodiment, this message is transmitted to the client in a synchronous manner with respect to reception of the incoming message. Hence, the client does not wait an inordinate amount of time to receive notification that it sent a corrupt message, as is often the case when validation is performed asynchronously on the back-end by the web service application.

In some scenarios, the web service application is in a better position to validate a message body because the application is intimately aware of the intended use of the information and/or business logic contained in the body, such as a purchase order. According to one embodiment, intermediary server 104 validates the structure of the message header against the header's corresponding schema type definition and, if the header complies with the schema, then the message is passed to the application layer, i.e., the web service application, for further validation of the message body against the body's corresponding schema type definition.

Hardware Overview

Figure 3:
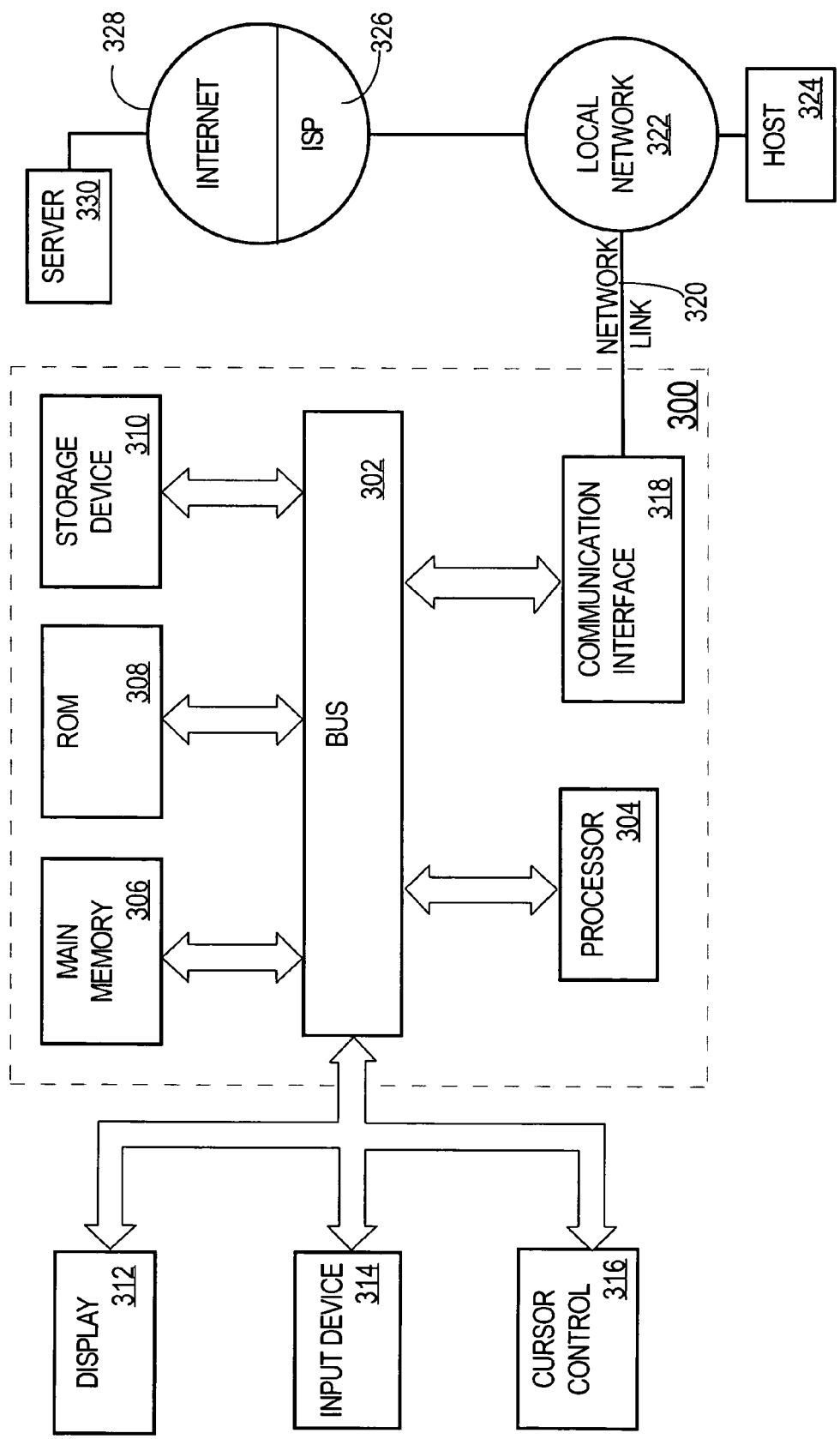
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions And Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

For example, reference is made to the currently common method of describing and publishing web services using WSDL and UDDI. However, as the development and description procedures and standards of web services evolve, the techniques described herein are applicable to other computer languages, procedures and standards that are associated with web services and which are not currently known. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for processing web service messages, the method comprising the computer-implemented steps of:
    an intermediary server receiving a message from a client, wherein said intermediary server handles communications between said client and a web service application;
    the intermediary server identifying one or more corresponding schema definitions that a structure of a portion of the message is supposed to comply with;
    the intermediary server determining whether the structure of the portion of the message complies with the one or more corresponding schema definitions to which the portion of the message is supposed to comply,
    wherein determining is performed by examining the one or more corresponding schema definitions;
    if the structure is determined to comply with the one or more corresponding schema definitions, then the intermediary server passing the message to the web service application; and
    wherein each of said one or more corresponding schema definitions defines at least one XML element;
    if the structure is determined not to comply with the one or more corresponding schema definitions:
        rejecting the message without communicating with said web service application; and
        transmitting a second message to the client which indicates that a portion of the message does not comply with the one or more corresponding schema definitions to which the portion of the message is supposed to comply.

2. The method of claim 1, wherein the step of receiving a message includes receiving a message that conforms to Simple Object Access Protocol (SOAP).

3. The method of claim 1, wherein the step of determining includes comparing a header of the message with a schema definition that is associated with said web service application.

4. The method of claim 1, wherein the step of determining includes comparing a body of the message with a schema definition that is associated with said web service application.

5. The method of claim 1, wherein the step of determining includes comparing a message header with a first corresponding schema definition and comparing a message body with a second corresponding schema definition.

6. The method of claim 1, further comprising the computer-implemented step of:

accessing said one or more corresponding schema definitions based on a reference in a description of said web service application, wherein said description is represented in Web Services Description Language (WSDL).

7. The method of claim 6, further comprising the computer-implemented steps of:
   identifying said web service application based on said message from said client; and
   identifying said description based on a mapping of web service applications to corresponding descriptions.

8. The method of claim 1, further comprising the computer-implemented steps of:
   identifying an XML element name and an associated namespace from said message from said client; and
   accessing said one or more corresponding schema definitions based on said XML element name and said associated namespace.

9. The method of claim 1, wherein the step of transmitting the second message is performed in a synchronous manner with respect to receiving the message at the intermediary server.

10. The method of claim 1,
   wherein the step of determining includes determining whether a first portion of said message complies with a first corresponding schema definition; and
   wherein the step of passing includes passing said message to said web service application for determining whether a second portion of said message complies with a second corresponding schema definition to which said second portion is supposed to comply.

11. A computer-readable storage medium storing one or more sequences of instructions which, when executed by one or more processors, causes the one or more processors to perform steps comprising: an intermediary server receiving a message from a client, wherein said intermediary server handles communications between said client and a web service application;
   the intermediary server identifying one or more corresponding schema definitions that a structure of a portion of the message is supposed to comply with;
   the intermediary server determining whether the structure of the portion of the message complies with the one or more corresponding schema definitions to which the portion of the message is supposed to comply,
   wherein determining is performed by examining the one or more corresponding schema definitions;
   if the structure is determined to comply with the one or more corresponding schema definitions, then the intermediary server passing the message to the web service application; and
   wherein each of said one or more corresponding schema definitions defines at least one XML element;
   if the structure is determined not to comply with the one or more corresponding schema definitions:
      rejecting the message without communicating with said web service application; and
      transmitting a second message to the client which indicates that a portion of the message does not comply with the one or more corresponding schema definitions to which the portion of the message is supposed to comply.

12. The computer-readable storage medium of claim 11, wherein receiving a message includes receiving a message that conforms to Simple Object Access Protocol (SOAP).

13. The computer-readable storage medium of claim 11, wherein determining includes comparing a header of the message with a schema definition that is associated with said web service application.

14. The computer-readable storage medium of claim 11, wherein determining includes comparing a body of the message with a schema definition that is associated with said web service application.

15. The computer-readable storage medium of claim 11, wherein determining includes comparing a message header with a first corresponding schema definition and comparing a message body with a second corresponding schema definition.

16. The computer-readable storage medium of claim 11, the steps further comprising:
   accessing said one or more corresponding schema definitions based on a reference in a description of said web service application, wherein said description is represented in Web Services Description Language (WSDL).

17. The computer-readable storage medium of claim 16, the steps further comprising:
   identifying said web service application based on said message from said client; and
   identifying said description based on a mapping of web service applications to corresponding descriptions.

18. The computer-readable storage medium of claim 11, the steps further comprising:
   identifying an XML element name and an associated namespace from said message from said client; and
   accessing said one or more corresponding schema definitions based on said ML element name and said associated namespace.

19. The computer-readable storage medium of claim 11, wherein transmitting the second message is performed in a synchronous manner with respect to receiving the message at the intermediary server.

20. The computer-readable storage medium of claim 11, wherein determining includes determining whether a first portion of said message complies with the first corresponding schema definition; and wherein passing includes passing said message to said web service application for determining whether a second portion of said message complies with the second corresponding schema definition to which said second portion is supposed to comply.

21. A system for processing web service messages, the system comprising:
   means for receiving a message from a client, at an intermediary server computer that handles communications between said client and a web service application;
   means for identifying, by the intermediary server computer, one or more corresponding schema definitions that a structure of a portion of the message is supposed to comply with;
   means for determining, by the intermediary server computer, whether the structure of the portion of the message complies with one or more corresponding schema definitions to which the portion of the message is supposed to comply;
   wherein determining is performed by examining the one or more corresponding schema definitions; and
   means for passing, by the intermediary server computer, the message to the web service application if the structure is determined to comply with the one or more corresponding schema definitions;
   wherein each of said one or more corresponding schema definitions defines at least one XML element;

means for rejecting the message without communicating with said web service application if the structure is determined not to comply with the one or more corresponding schema definitions; and means for transmitting a second message to the client which indicates that a portion of the message does not comply with the one or more corresponding schema definitions to which the portion of the message is supposed to comply if the structure is determined not to comply with the one or more corresponding schema definitions.

* * * * *